United States Patent [19]

Thoms

[11] Patent Number: 4,596,629

[45] Date of Patent: Jun. 24, 1986

[54] TELEVISION PICTURE TUBES

[75] Inventor: Roland Thoms, Mullheim, Fed. Rep. of Germany

[73] Assignee: BMC Industries, Inc., St. Paul, Minn.

[21] Appl. No.: 709,747

[22] Filed: Feb. 4, 1985

Related U.S. Application Data

[60] Division of Ser. No. 416,571, Sep. 13, 1982, Pat. No. 4,518,892, which is a continuation-in-part of Ser. No. 343,149, Jan. 28, 1982, Pat. No. 4,389,592, which is a continuation of Ser. No. 148,682, May 12, 1980, abandoned.

[51] Int. Cl.[4] .......................... C23F 1/02; B44C 1/22; C03C 15/00; C03C 25/06

[52] U.S. Cl. .................................. 156/644; 156/654; 156/661.1; 430/23

[58] Field of Search .................... 156/644, 654, 659.1, 156/661.1; 430/5, 23, 312, 313, 318; 313/403

[56] References Cited

U.S. PATENT DOCUMENTS

| | | | |
|---|---|---|---|
| 3,036,962 | 5/1962 | McNutt | 156/644 X |
| 3,139,392 | 6/1964 | Mears | 156/644 X |
| 3,973,965 | 8/1976 | Suzuki et al. | 156/644 X |
| 4,303,466 | 12/1981 | Thoms | 156/644 X |

*Primary Examiner*—William A. Powell
*Attorney, Agent, or Firm*—Jacobson & Johnson

[57] ABSTRACT

A television tube having an electron gun and an aperture mask with a plurality of line of sight openings in the aperture mask wherein the line of sight openings in the aperture mask are partially defined by material on the cone side surface of the aperture mask and partially defined by material on the grade side surface of the aperture mask with the aperture opening size and shape varying in accordance with the position of the opening in the aperture mask. Two techniques known as the capital I and capital H resist layout techniques are taught to illustrate the formation of the aperture mask.

4 Claims, 32 Drawing Figures

TELEVISION PICTURE TUBES

CROSS REFERENCE TO RELATED APPLICATIONS

This application is a division of application Ser. No. 416,571, filed Sept. 13, 1982, now U.S. Pat. No. 4,518,892, which is a continuation-in-part of U.S. patent application Ser. No. 343,149, filed Jan. 28, 1982, titled "Television Picture Tube," now U.S. Pat. No. 4,389,592, dated June 21, 1983, which is a continuation of U.S. patent application Ser. No. 148,682, filed May 12, 1980, titled "Television Picture Tube," now abandoned.

BACKGROUND OF THE INVENTION

1. Field of the Invention

This invention relates generally to television picture tubes and, more specifically, to television picture tubes having aperture masks with a plurality of line of sight openings therein with one side of the aperture mask located adjacent the phosphor screen.

2. Description of the Prior Art

The prior art concept of color television tubes is old in the art as evidenced by numerous patents thereon. Typical of the prior art color televsion aperture picture tubes is the Fyler, et al. U.S. Pat. No. 2,690,518 which discloses a glass tube with three electron guns located at the rear of the tube. The electron guns direct a beam of electrons at a television aperture mask or shadow mask which is made of a thin metal sheet. Located adjacent the aperture mask and on the opposite end of the tube is a glass face plate. On the face plate there are groups of three phosphor dots or stripes which comprise the three primary colors, red, blue and green. The aperture mask openings are located with respect to the phosphor dots so that electrons from each gun will strike only the phosphor dot or phosphor stripes associated with the opening in the mask. Because of problems in accurately etching the small holes in an aperture mask, the industry has developed etching procedures that require removing a mass of metal from one surface of the aperture mask. This process in effect provides a thinner section on portions of the mask. Since the section is thinner one can accurately etch smaller openings in the thinned sections of aperture mask as opposed to aperture masks with unthinned sections. In a mask etched in this manner the side where the most metal is removed is denoted as the cone side and the opposite side as the grade side. Because of the resulting geometry of the etched opening the grade side of the mask is positioned toward the electron gun with the cone side toward the phosphor screen.

The various types of aperture masks for use in color television tubes include slot masks having elongated slots which are shown in the Yamada, et al. U.S. Pat. No. 883,770. Yamada shows a series of elongated slots with a bridge or tie bar located between the slots to provide structural strength for the mask. The bridge or tie bar is located on the grade side of the aperture mask that faces the electron gun with the cone side facing the phosphor screen.

The Roeder prior art U.S. Pat. No. 3,809,945 shows an aperture mask for use having a plurality of additional rows of apertures which are etched part way through on the periphery of the aperture mask to provide an intermediate yield strength to the aperture mask.

Another type of prior art mask is shown in the Tomita U.S. Pat. No. 3,787,939 which shows a two material aperture mask which has been etched from opposite sides. The Tomita patent (FIG. 1) illustrates the operating position of the electron beams emanating through the opening from the grade side of the mask. The configuration of each perforation is in the form of a frustum of a cone with the larger diameter cone being on the side located adjacent the phosphor screen.

The Yamuchi, et a1. U.S. Pat. No. 4,168,450 shows an aperture mask in which the tie bars or bridges are formed at an angle $\theta$ to hide the central protrusions of the bridges from intercepting the electron beam.

A method of laying down the phosphor pattern is shown in the Law U.S. Pat. No. 3,770,434 which uses a coating of materials on opposite sides of the mask.

In the prior art television tubes inventions, particularly those utilizing elongated slots, it has been the standard procedure to mount the aperture mask with the grade side facing the electron gun and the cone side facing the phosphor screen to thereby minimize electron scattering which produces inferior color.

The Suzuki, et al. U.S. Pat. No. 3,882,347 shows a television slot mask with elongated slots. Note, FIG. 4 reveals the enlarged or cone side toward the face plate and the grade side toward the electron guns. FIG. 2 shows tie bars or bridges which are located on the ends of the slot with the wider portion of the tie bars facing toward the grade side rather than the cone side.

The present invention comprises improvement to television tubes which comprise a television tube with an aperture located there in having the cone side facing the electron guns and the aperture mask having line of sight openings formed by portions of surfaces on the opposite side of the mask forming the boundaries of the line of sight openings. The resulting television picture tube has greater brightness and color purity than prior art television tubes. Thus, the present invention premits an aperture mask to be mounted in a television picture tube with either the cone side or the grade side facing the electron gun.

SUMMARY OF THE INVENTION

Briefly, the present invention comprises a television picture tube having an aperture mask with a plurality of line of sight openings. The aperture masks comprise a sheet of material having a line of sight opening wherein a portion of the line of sight opening is partially defined by the cone side surface material and the remainder of the edges of the line of sight openings defined by the grade side material with the aperture opening size and shape varying according to position on the mask.

DESCRIPTION OF THE PREFERRED EMBODIMENTS

Figure 1:
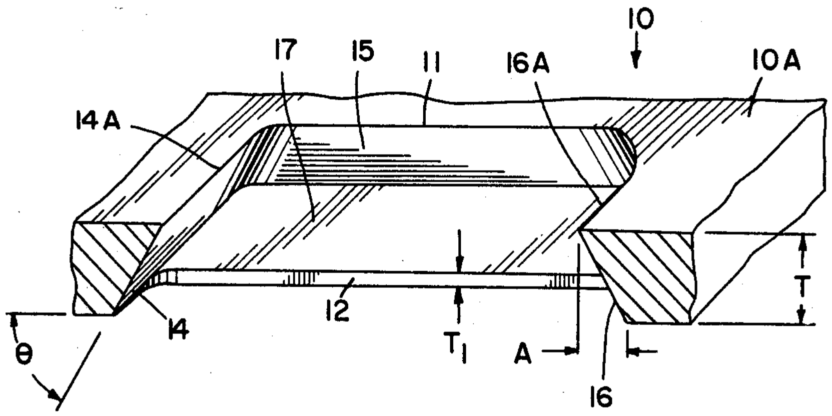
FIG. 1 is a perspective view of a single line of sight opening in a television aperture mask.
Figure 2:
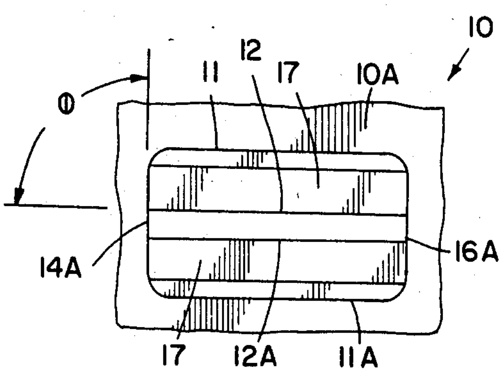
FIG. 2 is a top view or cone side view of the line of sight opening of FIG. 1.
Figure 3:
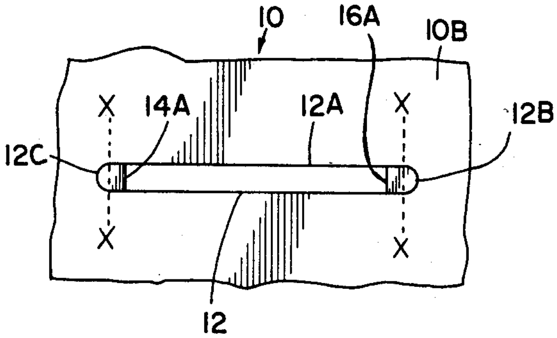
FIG. 3 is a bottom view or grade side view of the line of sight opening of FIG. 1.

Referring to FIGS. 1, 2 and 3, reference numeral 10 generally defines a portion of a television aperture mask having a cone side surface 10A and a grade side surface 10B. Surface 10A is referred to as the cone side since the larger opening or recess 15 is located therein and surface 10B is referred to as the grade side. In typical use of an aperture mask in a television picture tube the grade side faces the electron guns while the cone side faces the television picture tube. This type of positioning provides the best pictures for conventional etched masks. Located in aperture mask 10 is a line of sight opening which has edges that are defined by the cone side surface 10A and the grade side surface 10B of aperture mask 10. Located in cone side surface 10A is a recess 15 which is defined in cone side surface 10A by pair of side edges 11 and 11A and a pair of end edges 14A and 16A which are all located in the plane of cone side surface 10A of aperture mask 10. Side edges 11 and 11A connect to end edges 14A and 16A to form a closed boundary in the plane of cone side surface 10A. Thus, edges 11, 11A and edges 14A and 16A define the junction of the side walls of recess 15 with the cone side surface 10A.

The side walls of recess 15 include an undercut surface 14 and an undercut surface 16 which respectively connect to edge 14A and edge 16A. Surfaces 14 and 16 are undercut downward from cone side 10A and radially outward from edges 14A and 16A toward grade side 10B.

The thickness of aperture mask 10 is denoted by T which usually ranges from 0.004" to 0.008". The length of undercut is denoted by A. The undercut angle is denoted by $\theta$ and the thickness of the remaining material that forms the bottom of recess 15 is denoted by $T_1$ with $T_1$ being substantially less than the thickness T of aperture mask 10.

Referring to FIG. 3 (grade side), it will be noted that the bottom view shows the outline of an elongated slot in grade side surface 10B which is defined by edge 12A, edge 12, edge 12B and edge 12C which are all located in the plane of grade side surface 10B. Edges 12 and 12A are straight whereas edges 12B and 12C are curved. The portion of the opening to the outside of lines X—X defines the portion of the opening which contains curved edges 12B and 12C.

The line of sight opening through aperture mask 10 is formed by edges 12A and 12 which define the longitudinal opening and edges 14A and 16A which define the transverse portion of the line of sight openings. Note, in the grade side view (FIG. 3) edge 12 and edge 12A also define the longitudinal opening; and edges 14A and 16A define the transverse portion of the line of sight opening. Although the grade side view of aperture mask 10 is different from the cone side view of aperture mask 10, the line of sight opening through aperture mask 10 is the same.

The two lines X—X, which are located on both ends of the elongated slot, denote the separation point between the curvature of edges 12B and 12C and straight sections 12A and 12. In the embodiment shown, lines X—X are located to the outside of edges 14A and 16A to thereby insure the line of sight opening in aperture mask 10 is comprised of a set of straight edges with substantially square corners. The curved ends are typical of cutting operations such as chemical etching.

Thus, although grade side surface 10B reveals an elongated opening therein which is substantially longer than the line of sight opening through the article, the surfaces 14 and 16, which were produced by undercutting material from edges 14A and 16A, project out sufficiently far to prevent the radiused edges 12B and 12C from forming a boundary of the line of sight opening through aperture mask 10.

In forming elongated openings in aperture mask, the process of etching permits one to etch a recess 15 in aperture mask 10. Typically, the etching process is continued until it produces a recess 15 with undercut surfaces 14 and 16. The size and shape of undercut surface can be controlled by the amount of etchant and time of etching and is generally within the skill of those in the art.

After forming recess 15 in one side, the elongated opening is etched from the opposite side. If desired, the elongated opening can be formed during the etching of the recess by simultaneously spraying etchant on opposite surfaces 10A and 10B. After etching, the elongated slot appears with radiused corners as shown in FIG. 3. The process of forming the line of sight opening through the article, the etching continues until the etchant penetrates through the material of thickness $T_1$. After penetration, the etchant is removed typically leaving an elongated opening such as defined by edges 12A, 12B, 12C and 12. Lines X—X denote the radius portion of elongated opening which results from the etching action.

An inspection of FIG. 3 shows the radius portion 12B and 12C project onto surfaces 15 and 16. Thus, the radiused corners 12B and 12C of aperture mask 10 do not form a part of the line of sight opening in aperture mask 10. While the article and method have been described with respect to rectangular openings, it is apparent the process can be used to make other unusually shaped line of sight openings which are difficult or impossible to make with conventional techniques.

EXAMPLE 1

To illustrate the improvement in light transmission, a conventional television aperture mask was etched having elongated slots with parallel sides and rounded ends. The dimensions of the slot were as follows:

slot width — 175.2 micrometers
tie bar width — 145 micrometers
slot length — 613 micrometers (maximum dimension).

The measured light transmission through the slot was measured as 17.7 units.

A second aperture mask was made in accordance with the present invention in which the outline of the line of sight opening had a substantially rectangular configuration in accordance with FIGS. 1, 2 and 3. The dimensions of the rectangular line of sight opening were as follows:

slot width — 174.8 micrometers
tie bar width — 144 micrometers
slot length — 614 micrometers.

The transmission through the opening was measured as 18.36 units or an increase of approximately 4 percent in light transmission. For the second mask, however, since the dimensions of the two holes were not exactly equal, a compensation for the area revealed that the second mask actually had an approximately 6.5 percent greater light transmission capability.

Figure 4:
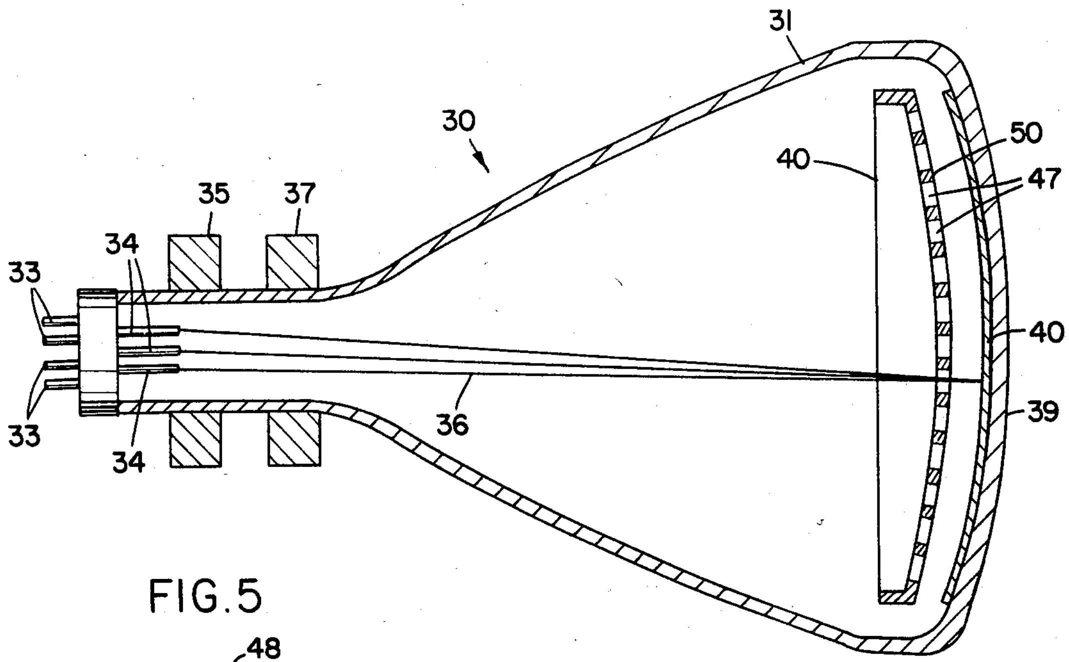
FIG. 4 is a cross sectional view of a television picture tube.

Referring to FIG. 4, reference numeral 30 generally designates a cross sectional view of a television picture tube using the line of sight aperture mask of the present invention. The television picture tube comprises a glass enclosure 31 having a base 32 and prongs 33 thereon for attachment to the electronics of the television set. Located on the exterior of the neck of the television picture tube is a focusing coil 35 that focuses the electron beam so the electron beams converge as they pass through openings 47 in aperture mask 48. Located adjacent focusing coil 35 is a deflection coil 37 which sweeps the electron beam across aperture mask 48. The aperture mask 48 is located with a plurality of elongated openings 47 located therein. Located immediately behind elongated slots 47 is a phosphor strip 40. Although three phosphor strips are located behind each opening in the cross sectional view, only one strip is visible in the cross sectional view. The phosphor strips comprise the primary colors red, blue and green when, when excited by the electrons, produce the proper color on face plate 39 of television picture tube 30.

Figure 5:
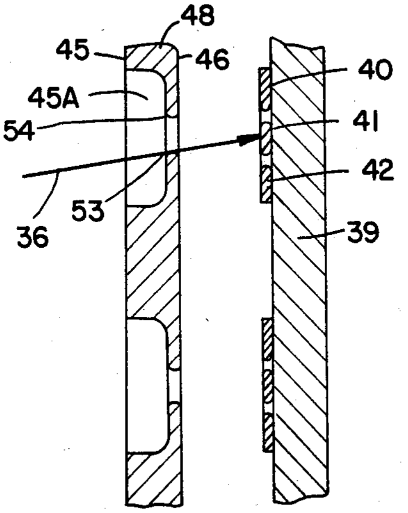
FIG. 5 is a partial top sectional view of an aperture mask and television tube.
Figure 6:
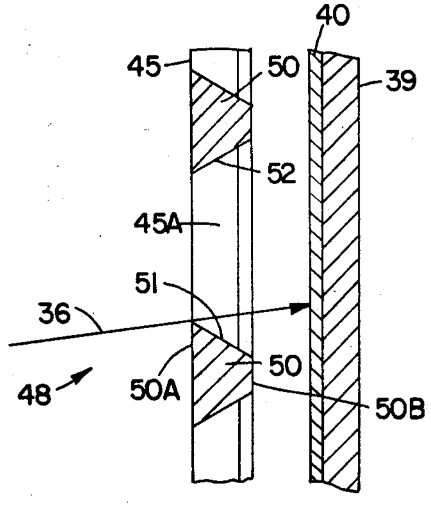
FIG. 6 is a partial side sectional view of an aperture mask and television tube.
Figure 7:
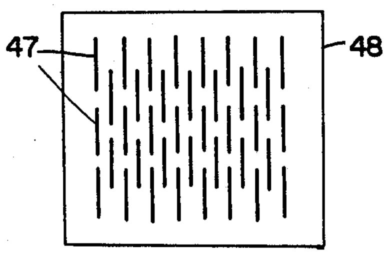
FIG. 7 is a front schematic view of an aperture mask having a plurality of openings therein.

To understand the operation of the present invention in a television picture tube, reference should be made to FIGS. 5 and 6 which respectively show a top view of a portion of the television aperture mask and a television picture tube and a side view of a television picture tube. The front glass envelope portion of the television picture tube is designated by reference numeral 39 with reference numerals 40, 41 and 42 designating the red, blue and green phosphor stripes which extend longitudinally parallel to the elongated openings which are located in aperture mask 48. FIG. 7 shows schematically the slot arrangement of a typical aperture mask having a series of elongated slots. Located between phosphor stripes 40, 41 and 42 is a suitable black light-absorbing medium that does not emit any color should it be struck by electrons.

Referring to FIG. 5, the aperture mask is denoted by reference numeral 48 and with cone side 45 facing the electron gun and the grade side 46 facing the phosphor stripes which are located on face plate 34. Since the most metal is removed from side 45 to provide recess 45A, this side is denoted as the cone side and is located facing the electron gun. Typical prior art aperture masks the cone side was located facing the phosphor side. FIG. 5 reveals how the grade side edge surfaces 53 and 54 limit the electrons in the lateral direction.

FIG. 6 shows a side view of aperture mask 48 with reference numeral 39 denoting the face plate and reference numeral 40 indicating a phosphor stripe. The aperture mask 48 has an opening 45A on the cone side 45 and an elongated opening on the opposite side. The tie bar or bridges as they refer to in the prior art are located with the narrow end of the bridge or tie bar facing the phosphor stripe 40 and the tie bar extending from the cone side 45 to grade side 46. FIG. 6 shows tie bar 50 to comprise a grade side surface 50B, a cone side surface 50A and an interior surface 51 on lower tie bar and an upper interior surface 52 on upper tie bar 50. The upper and lower boundaries of the line of sight opening in aperture mask 48 is defined by the junction of surface 52 with cone side surface 44 and junction of surface 51 with cone side surface 45.

In practice the plurality of tie bars located in the spaced relationship provide for accurate defining of an opening for the excitation of the phosphor stripes located along the television picture tube.

Note, if the aperture masks have the cone side facing the electron gun, one should have the bottom of the recess region, which is located adjacent the sides of the line of sight openings, be sufficiently flat or angled so that the electron beams that impinge on the bottom of the recess region do not deflect through the line of sight opening in the aperture mask. Typically, if the bottom of the recess region is parallel to the mask cone side surface, one does not obtain scattering electron reflections through the line of sight openings.

In addition, with the aperture mask cone side facing the electron guns the portion of the recess side walls which do not define a portion of the line of sight opening should be set sufficiently far back from the line of sight opening in the aperture mask so that the path of the electron beam is not obstructed by the recess region side walls or the cone side surface of the aperture mask.

Figure 8:
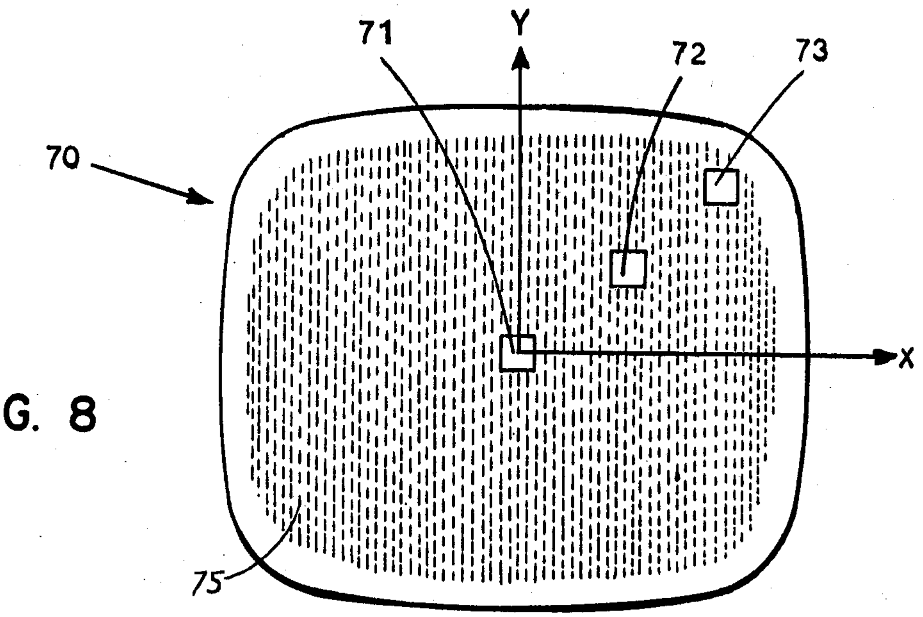
FIG. 8 is an alternate view of a television aperture mask.

Alternate embodiments of the aperture mask in a television picture tube are shown in FIGS. 8–32 with FIG. 8 showing a front view of a line of sight television aperture mask 70 for mounting in television picture tube 30. Television aperture mask 70 contains a plurality of elongated openings 75 which are spaced in vertical rows throughout the mask. Reference numeral 71 identifies the central area of the aperture mask, reference numeral 73 identifies the periphery of the aperture mask 70 and reference numeral 72 identifies an intermediate mask area between mask areas 71 and 73. These areas will be referred to in describing enlarged sections of apertures 75 to point out the variation in aperture size and shape according to the location of the aperture on aperture mask 70.

In general, the line of sight mask shown in FIG. 8 has a recess surrounding each of the apertures. The recess forms a cavity in the surface of the mask which results in a thin mask section that can be etched more precisely and accurately than a thick mask section. The surface of the aperture mask containing the recesses is referred to as the cone side of the aperture. In order to produce aperture openings with accurate and precise dimensions and shape, it is desired to have the bottom of the recess as flat and parallel to the opposite surface of the mask as possible. If the thickness of the mask in the thin regions at the bottom of the recess is relatively uniform, the openings which are etched through the mask in the thin regions can be etched to relatively precise dimensions and shape to thereby provide maximum electron transmission. As a general rule, the larger the size of the recess in relation to the size of the aperture opening, the more accurately one can etch the size and shape of the aperture. However, the larger the recess the structurally weaker the mask. Consequently, one of the objects of my invention is to optimize the shape and size of the opening in the mask while still maintaining a mask that can withstand the stresses due to temperature variations that occur within a television picture tube.

A method I have found which permits me to obtain a surface on the bottom recess which produces a shape that permits me to accurately form a line of sight opening without over-sizing the cone and weakening the mask is to use what I refer to as the capital H technique. The layout of the etchant resist pattern which begets the name the capital H technique can be visualized with reference to FIG. 16 and FIG. 17 which show the outline of an etchant resist pattern in which the cone side resist pattern is denoted by reference numeral 81. To illustrate the grade side etchant resist pattern 82 in relation to the cone side etchant resist pattern 81 the grade side etchant resist pattern 82 is shown as a dotted line 82 which is superimposed on the cone side resist pattern 81. Obviously, the grade side resist pattern 82 would not appear on the same side of the mask as the cone side resist pattern 81 but the registration of etchant resist pattern shown by FIG. 16 illustrates the locational coaction between the two etchant resist patterns which produce the aperture of final size and shape.

Figure 16:
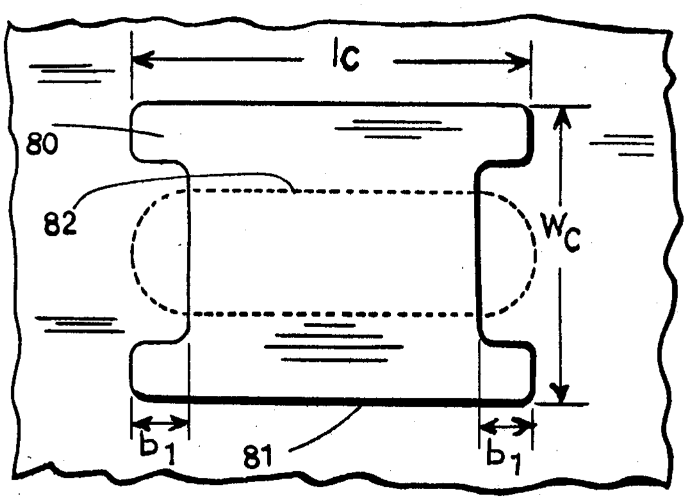
FIG. 16 shows the resist pattern for the capital H etching technique.
Figure 17:
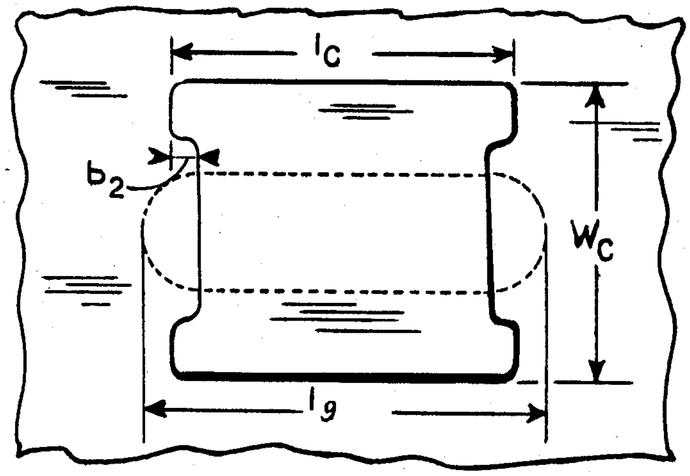
FIG. 17 shows the resist pattern for the capital H technique at a different location in the mask.

Referring to FIGS. 16 and 17, the dimension $b_1$ denotes the offset distance or length of the cone shaped resist pattern 81 that extends inward and which I refer to as the resist tongue. The length of the opening on the cone side resist pattern 81 is designated by $l_c$ and the length of the opening in the grade side resist pattern 82 is denoted by $l_g$ with the width of the cone designated as $W_c$. As can be visualized from FIG. 16 the visual appearance of the etchant resist pattern 81 on the cone side has the general appearance of a captial H. In the preferred use of the capital H technique the length of tongues $b_1$ at the center of the aperture mask area 71 is at maximum which is determined by the thickness of the material, the composition of the material and the desired final dimensions of the aperture. Generally, with the capital H technique the tongue dimension $b_1$ decreases in a radially outward direction from the center of mask 70. For example, FIG. 16 shows a relatively large offset dimension $b_1$ at mask area 71 while FIG. 17 illustrates a smaller offset $b_2$ at mask area 73. That is, one of the features of the present invention is the tongues of the cone shape resist pattern decrease in size resulting in an increase in the size of the cone area as one proceeds radially outward from the center of the mask.

Figure 9:
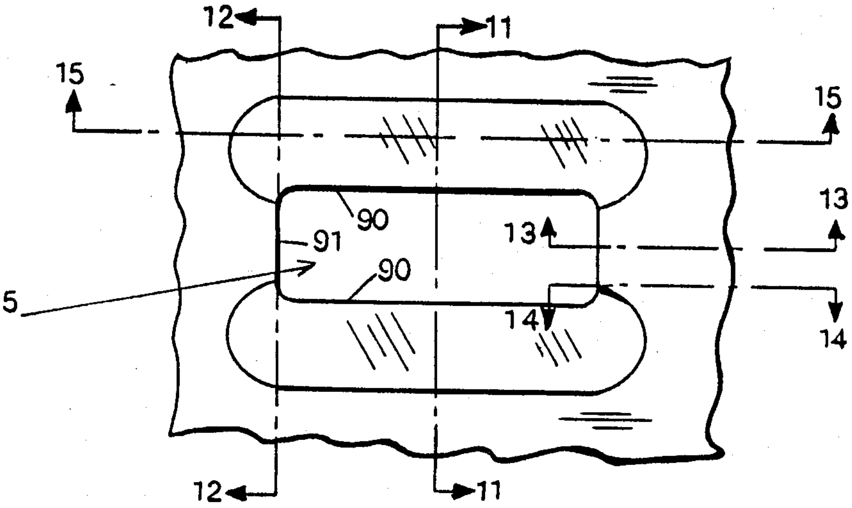
FIG. 9 shows an enlarged cone side view of an opening in the center of an aperture mask.
Figure 10:
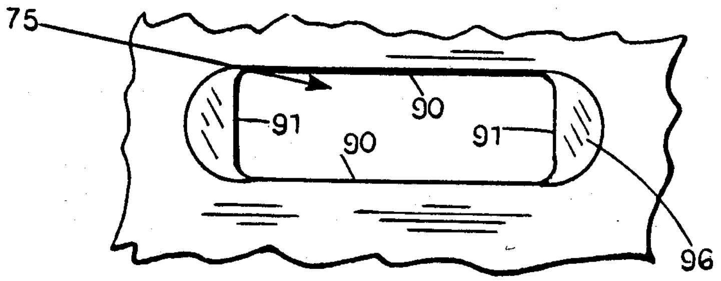
FIG. 10 shows an enlarged grade side view of the aperture of FIG. 9.

To illustrate the appearance of an aperture etched in accordance with the capital H technique illustrated in FIG. 16 reference should be made to FIGS. 9–15. FIG. 9 shows the cone side view of a portion of aperture mask 70 with an enlarged aperture 75 that is formed in an aperture mask 70 at the aperture mask location designated by numeral 71. FIG. 10 shows the grade side view of the same aperture 75 at the same location 71 in aperture mask 70.

FIG. 9 and FIG. 10 show the lateral boundaries of the line of sight openings of aperture 75 defined by mask portions 90 while the end boundaries of the line of sight openings of aperture 75 are defined by mask portions 91.

Figure 11:
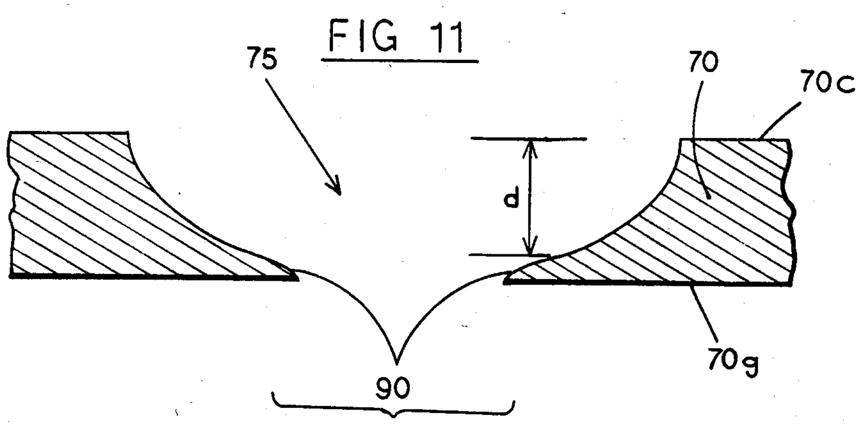
FIGS. 11 through 15 show selective sections taken through the section lines of FIG. 9.
Figure 12:
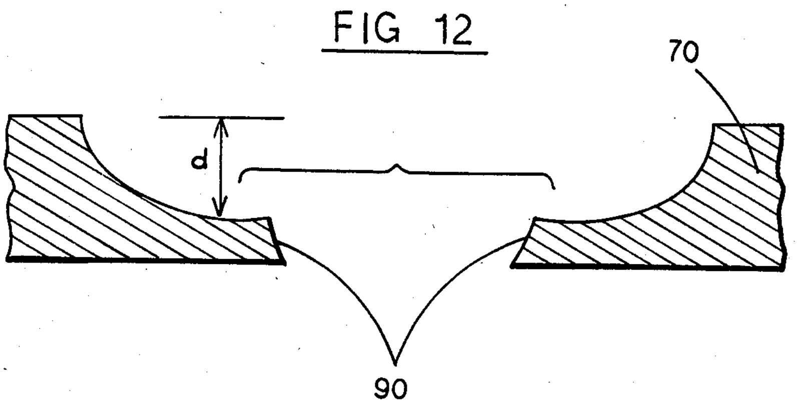

In order to illustrate how the capital H technique affects the shape of the recess and the final size of aperture 75 reference should be made to FIGS. 11–15 which show various cross sectional views taken along designated sectional lines of FIG. 9. For example, FIG. 11 shows a cross sectional slice taken along line 11—11 to reveal the shape of the line of sight boundaries 90 at the center portion of aperture 75 and on grade side surface **70*g*. The letter d denotes the depth of the recess before the surface begins to curve upward to cone side surface 70*c* of aperture mask 70. Line 12—12 (FIG. 12) shows a similar cross sectional slice which is virtually at the end of aperture 75. FIG. 12 shows the depth of the recess which was designated by d is slightly less in FIG. 12 than it is in FIG. 11. In addition, the portion of the mask 90 that defines the lateral line of sight boundary 90 is somewhat wider at the end of the aperture 75 than at the center of aperture 75**.

It has been found that if the depth d could be maintained at a uniform value from end to end of the recess, one would have optimal conditions for accurately forming an etched opening of precise size and shape; however, to do so would remove sufficient material that may weaken the mask. Consequently, to avoid weakening the mask to a point that would interfere with the operation of the television picture tube I permit the dimension d to increase from its centermost value (FIG. 11) to its end value (FIG. 12). While the dimension d may vary from mask to mask, in general the dimension d which is at or near the midpoint of mask 70 is the greatest with dimension d increasing as one approaches the end of the aperture.

Figure 13:
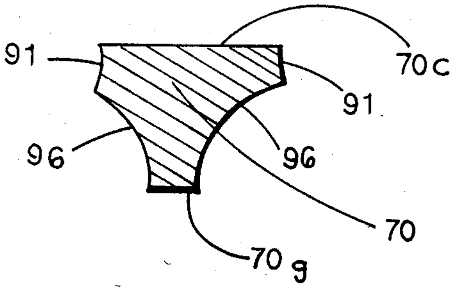
Figure 14:
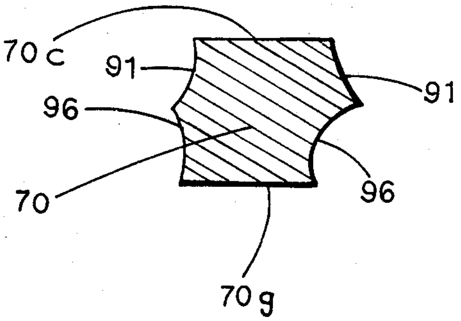

To control or maintain the depth d at the relative distance shown in FIGS. 11 and 12, I use the capital H technique of resist outline pattern shown in FIG. 16. Since the lateral surfaces 90 only define two of the line of sight boundaries reference should be made to FIGS. 13 and 14 to show the surfaces that define the line of sight boundaries on the ends of aperture 75. FIG. 13 shows a tie bar section which comprises a sectional slice taken along line 13—13 of FIG. 11. One notes the tie bar region has surfaces 91 that define the ends of the line of sight boundaries and that surfaces 91 are located on the cone side **70*c* of aperture mask 70 in contrast to surfaces 90 which are located on the grade side 70*g* of mask 70. The section taken along lines 14—14 and shown in FIG. 14 shows how the tie bar shape changes as it gets closer to the lateral edge of aperture 75; however, although surfaces 91 are slightly lengthened and inclined as they approach the lateral edges of the aperture they still provide the cone side line of sight opening boundaries for the end of aperture 75. The tie bar surfaces 96 are overlap areas that are visible when viewing through the aperture from the grade side (FIG. 10**).

Figure 15:
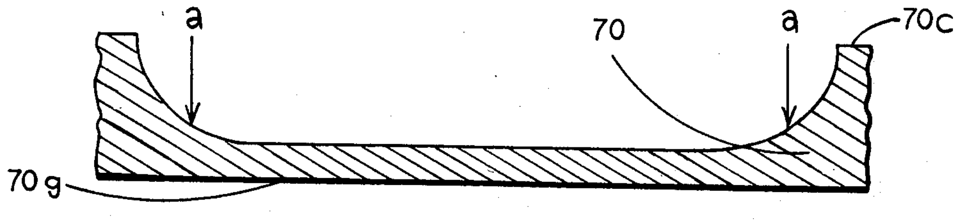

FIG. 15 shows an elongated section view of the cone taken along lines 15—15 of FIG. 11 with the arrows a indicating where the ends of aperture terminate with respect to the recess. As can be seen from FIGS. 9–15 the capital H technique permits the line of sight openings of an aperture to be relatively constant although the actual boundaries that define the shape and size of the line of sight opening vary from one portion of the aperture to another.

The effects of the capital H etching technique have been illustrated with respect to an aperture located in the center of the mask. In the center of the mask electron beams generally impinge at a right angle with respect to the aperture mask. If one refers to FIG. 10 one notes if the two tie bar overlap areas 96 which are visible from the grade side of the mask can be kept at a minimum one can minimize unwanted electron scattering. It has also been found that when the grade side of the mask faces the electron gun the size of the tie bar overlap areas 96 become less important on the periphery of the mask than in the center of the mask. That is, since the electron beam impinges at a lesser angle on apertures at the periphery of the mask than at the center of the mask the offset area can be larger at the periphery area of the mask than at the center while still maintaining the value of electron scattering below a predetermined level. Consequently, tie bar overlap area 96 can be permitted to become somewhat larger at the periphery of the mask than at the center of the mask. This feature is obtained by permitting tongue dimension b to decrease on aperture which are located at the periphery of the mask. Thus, the present invention defines structure that produces a minimum tie bar area 96 at the center of mask 70 and permits increased tie bar overlap area at the periphery of the mask; however, since the angle of the electron beam changes as one proceeds radially outward the visual effects of electron scattering is maintained at a relatively constant value throughout the mask even though electron reflecting surfaces of tie bar overlap areas increase toward the periphery of the mask.

It will be understood that the above effect can be obtained with various size apertures and in practice the dimensions can be determined by trial and error once the dimensions of the aperture openings and the thickness of materials is known.

Figure 18:
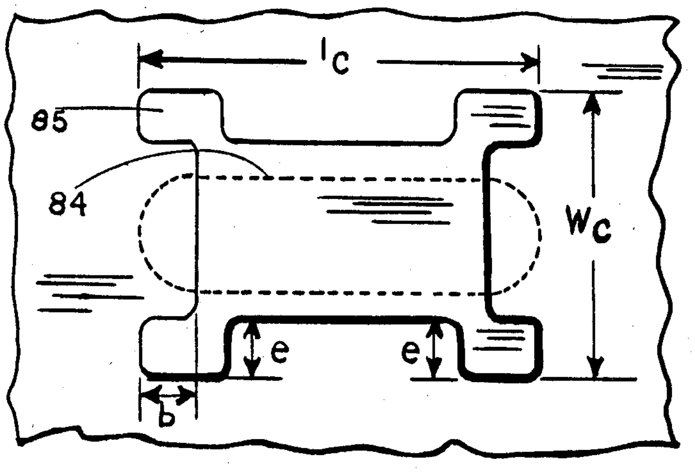
FIG. 18 shows the resist pattern for manufacturing aperture openings in accordance with the combination of the capital H and capital I techniques.

In order to further enchance the shape and size of the aperture I have provided a further compensating technique which I can use with the above described capital H technique. I refer to my second technique as the capital I technique. In order to understand the combination of the capital H and capital I techniques reference should be made to FIG. 18 which shows the cone side etch resist pattern 85 produced by the combination of the capital I technique and the capital H technique. To illustrate the relationship to the cone side resist pattern 85 to the grade side resist pattern 84 the grade side resist pattern 84 is shown by dotted lines. The main difference between FIG. 16 and FIG. 18 is that the sides of the cone resist pattern 85 have inward extending resist tongues that extend inward a distance e. The capital H and I techniques can be most effictively used when one mounts the cone side facing the electron gun in the composite capital H and I techniques.

It is the side tongue dimension e which is largest for the apertures in the center of the mask and decreases for those apertures located at the periphery of the mask. At the center of the mask the cone width is at a minimum since the electron beam impinges at substantially right angles to aperture mask 70. Thus, the cone area need not be as wide at the center of the aperture mask as at the edge of the aperture where the electron beams impinge at an angle. This is particularly true when the cone side of the aperture mask is facing the electron gun. To illustrate the combination of the capital H and I techniques on an aperture reference should be made to FIGS. 19-25 which show the aperture configuration at the center of the mask (area 71) and FIGS. 26-32 which show the aperture configuration at the corner of the aperture mask (area 73).

Figure 19:
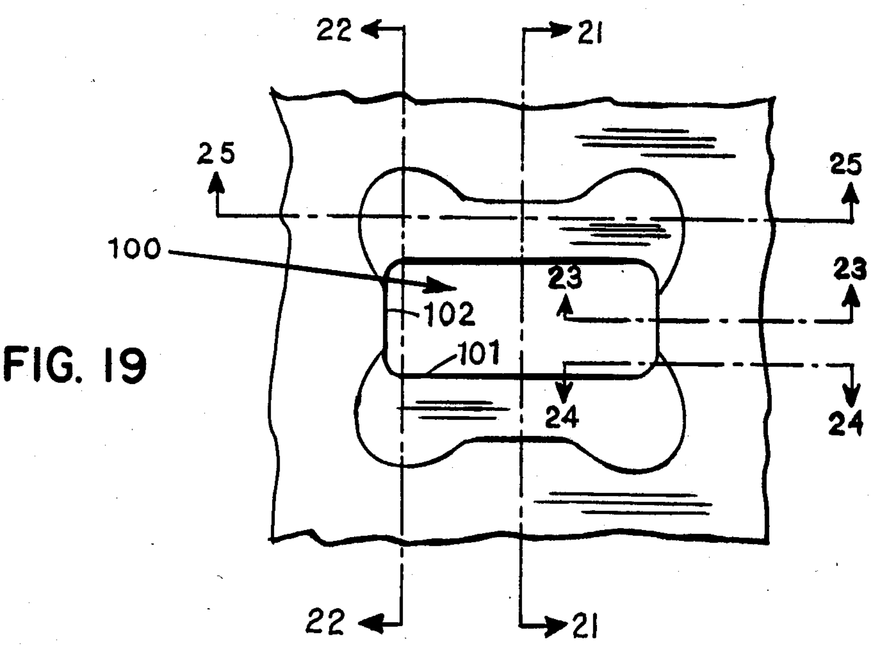
FIG. 19 shows an enlarged view of the cone side of an aperture.
Figure 20:
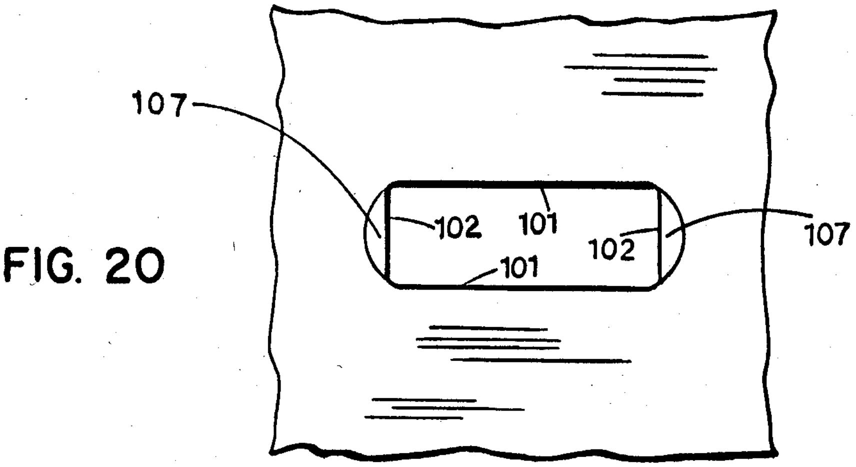
FIG. 20 shows an enlarged view of the grade side of an aperture of FIG. 19.

To illustrate the appearance of an aperture etched in accordance with the capital H and I techniques as illustrated in FIG. 18 reference should be made to FIGS. 19-25. FIG. 19 shows the cone side view of an aperture mask with an enlarged aperture 100 that is formed in an aperture mask at the aperture mask location designated by numeral 71. FIG. 20 shows the grade side view of the same aperture 100 at the same location in aperture mask 70. The boundaries or the line of sight opening through the aperture mask are defined by portions of masks from the opposite sides of the mask.

FIG. 19 and FIG. 20 show the lateral boundaries of the line of sight openings designated by mask portions 101 while the end boundaries of the line of sight openings are defined by mask portions 102 and the overlap areas are designated by reference numeral 107.

Figure 21:
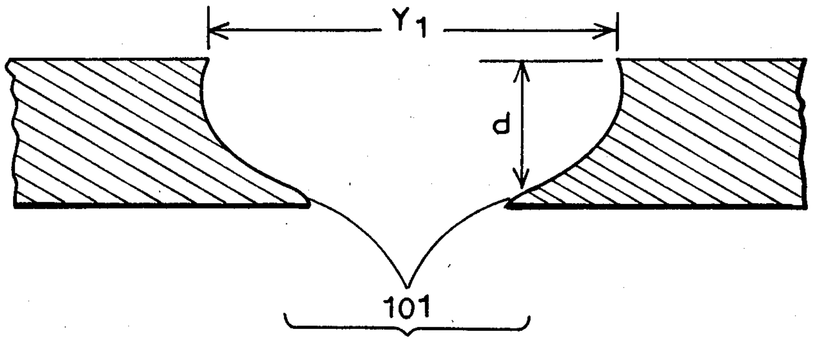
FIGS. 21 through 25 show selective sections taken through the section lines of FIG. 19.
Figure 22:
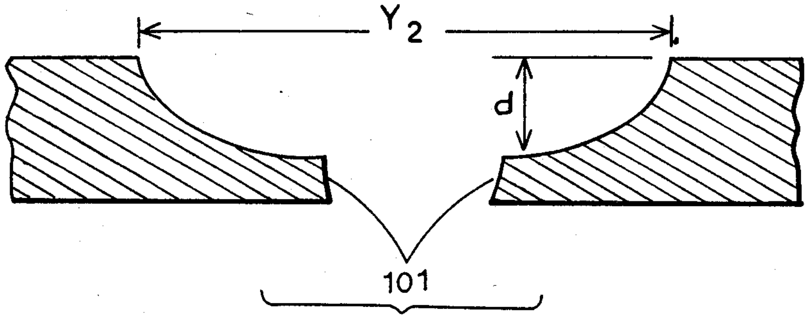
Figure 23:
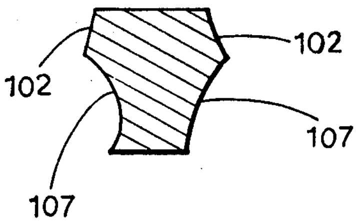

In order to illustrate how the combined capital H and capital I techniques effect the shape of the recess and final size of the aperture opening 100 reference should be made to FIGS. 21-25 which show cross sectional appearance which are designed sectional lines of FIG. 19. For example, FIG. 21 shows a cross sectional slice taken along line 11—11 to reveal the line of sight boundaries 101 of the aperture mask 70. The letter d denotes the depth of the recess in region before the surface begins to curve upward to the cone side surface of the aperture mask. Line 22—22 (FIG. 22) shows a similar cross sectional slice which is virtually at end of aperture 100. FIG. 22 shows that the depth of the recess which is designated by d is slightly less in FIG. 22 than it is in FIG. 21. Also, the portion of the mask that defines the lateral line of sight boundary 104 is somewhat wider at the end of aperture 100. While this was also true with the capital H technique alone, the combination with the capital I technique has a dimension $Y_1$ at the center (FIG. 21) of aperture 100 and a larger dimension $Y_2$ at the end of aperture 101. If one decreases the cone width for an aperture at the center of the aperture mask, one does not interfere with the electron beam which is at substantially a right angle to the aperture at the center of the mask. Thus, a smaller cone width is permissible in the center region of the aperture mask.

Figure 24:
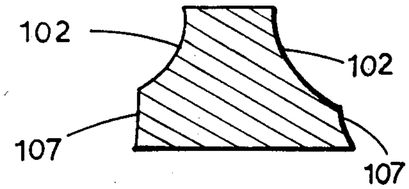
Figure 25:
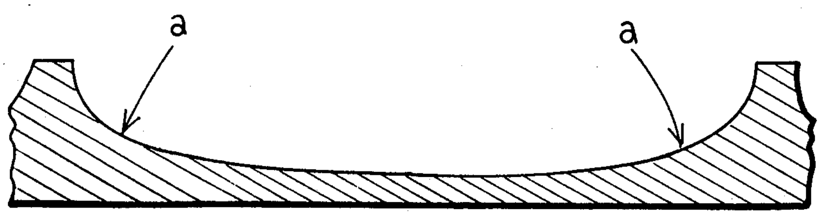

The lateral surfaces 101 define two of the line of sight boundaries of aperture 100 on the grade side of the mask and the tie bar region surfaces 102 define the line of sight boundaries on the cone side of the aperture mask. A section taken along lines 24—24 and shown in FIG. 24 shows how the tie bar shape changes as it gets closer to lateral edge of the aperture with the overlap surface 107 providing a boundary of the line of sight opening in certain regions of the aperture opening. FIG. 25 shows how an elongated section view of the cone taken along lines 25—25 of FIG. 19 with the arrows a indicating where the ends of aperture terminate located with respect to the recess. As can be seen from FIGS. 19-25 the capital H and I techniques permit the line of sight opening through the aperture to remain the same although the actual boundaries that define the shape vary from one portion of the aperture to the other.

Figure 26:
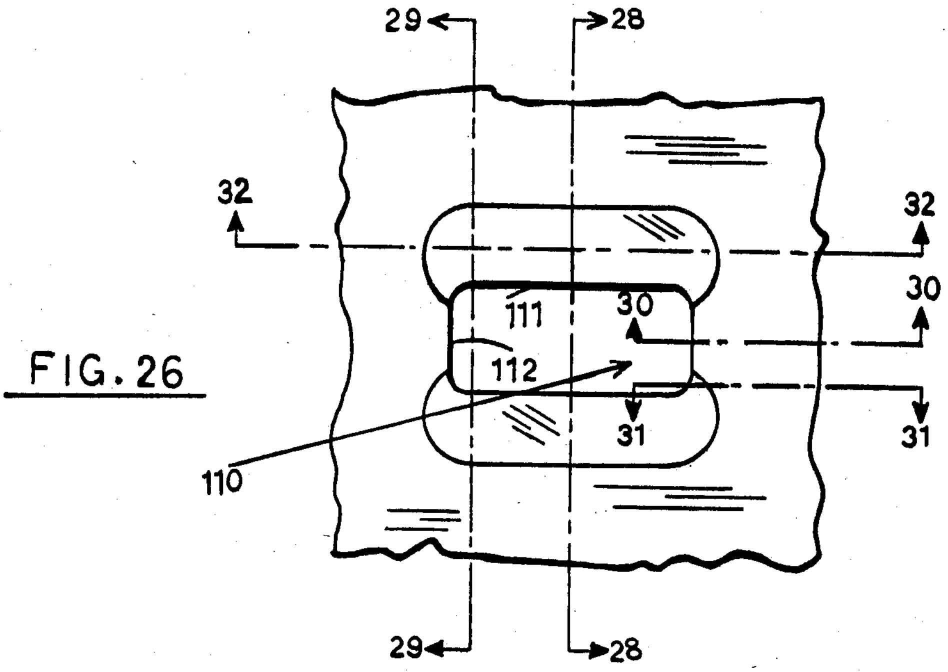
FIG. 26 shows an enlarged view of the cone side of an aperture.
Figure 27:
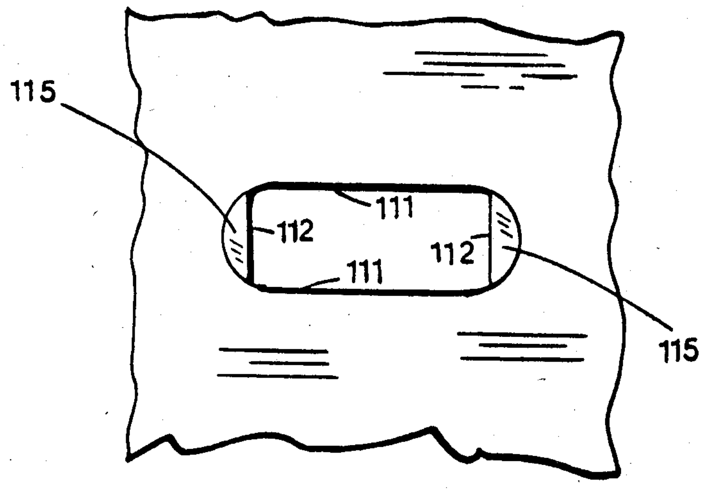
FIG. 27 shows an enlarged view of the grade side of the aperture of FIG. 26.
Figure 28:
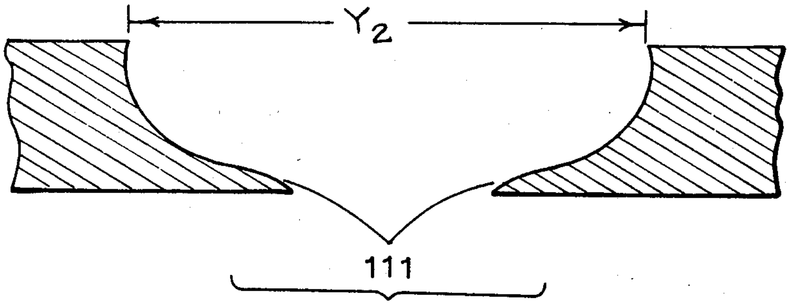
FIGS. 28 through 32 show selective sections taken through the section lines of FIG. 26.
Figure 29:
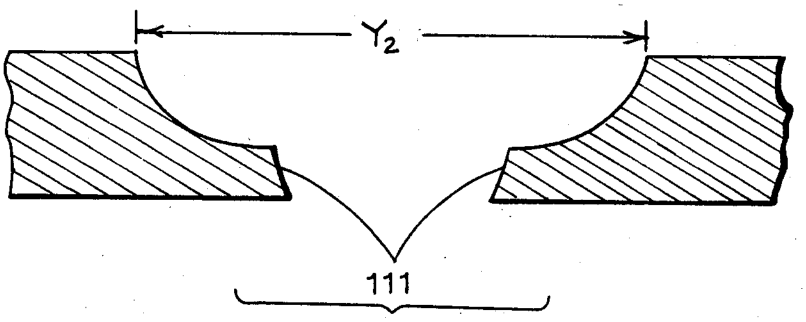
Figure 30:
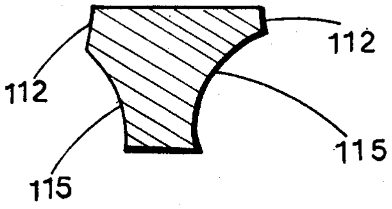
Figure 31:
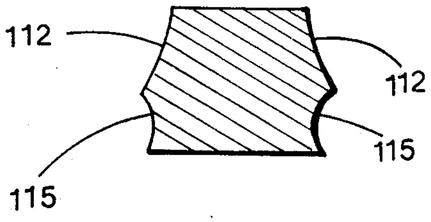
Figure 32:
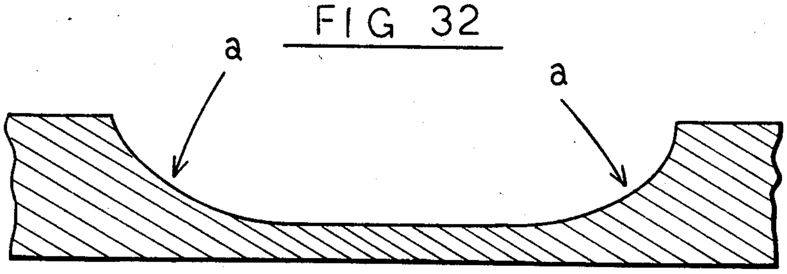

In order to understand how the aperture shape changes in the periphery of the mask an aperture at the periphery of the mask has been enlarged and shown in FIGS. 26-32. FIG. 26 shows the cone side view of aperture 110 and FIG. 27 shows the grade side view of aperture 110. Aperture 110 has surfaces 111 that define the lateral boundaries and end surfaces 112 that define the end boundaries reference numeral 115 identifies the overlap areas. FIGS. 28 and 29 show the shape of surfaces 111. FIGS. 30 and 31 show how the tie bar surfaces 112 which define the end boundary vary from the center outward, while FIG. 32 shows how the cone recess appears in relation to aperture which terminates at the points indicated by arrows a. FIGS. 26–32 show how the shape of the openings differ as well as to point out the dimension or width of cone side recess is substantially uniform with dimension $Y_2$ throughout the length of the cone side recess. That is, as one proceeds radially outward the tongue resist dimension e decreases so the cone has the full width at those apertures located on the periphery of the mask. The wider cone at the periphery of the mask is advantageous since the electron beams must enter the peripheral aperture openings at an angle which is substantially less than the 90 degrees. Thus, the full width cone at the periphery of the mask permits the edges of the cone from interfering with the electrons directed at the peripheral aperture openings.

I claim:

1. The method of making a television aperture mask for insertion into a television picture tube comprising the steps of forming a resist pattern in the shape of a capital H on one side of the mask with said resist pattern having resist tongues that extend inward, forming a resist pattern in the shape of an elongated opening on the opposite side of the mask and then etching the mask to produce a line of sight opening in said mask.

2. The method of claim 1 wherein said step of forming a resist pattern includes the step of forming resist tongues of lesser dimension as one forms resist patterns for apertures that are located radially outward from the center of the mask.

3. The method of claim 1 wherein the resist pattern is formed with lateral resist tongues to reduce the exposed area of the mask to be etched in the lateral direction.

4. The method of claim 3 including forming the lateral tongues around the apertures in the center of the aperture mask of a larger dimension than the lateral tongues located around the aperture in the periphery of the aperture mask.

* * * * *